(12) United States Patent
Varela

(10) Patent No.: US 8,313,410 B2
(45) Date of Patent: Nov. 20, 2012

(54) PLANETARY WHEEL END ASSEMBLY

(75) Inventor: Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 665 days.

(21) Appl. No.: 12/496,761

(22) Filed: Jul. 2, 2009

(65) Prior Publication Data

US 2011/0003661 A1 Jan. 6, 2011

(51) Int. Cl.
*F16H 57/08* (2006.01)
*B60K 17/06* (2006.01)
*B60K 17/04* (2006.01)

(52) U.S. Cl. ......... 475/331; 475/344; 180/369; 180/372

(58) Field of Classification Search .................. 475/331, 475/344; 180/371, 372, 383, 385, 364, 369; 192/221.1
See application file for complete search history.

(56) References Cited

U.S. PATENT DOCUMENTS

| | | | |
|---|---|---|---|
| 3,055,236 A | 9/1962 | Born, Jr. | |
| 4,095,675 A | 6/1978 | Bell | |
| 4,142,615 A * | 3/1979 | Sidles et al. | 192/221.1 |
| 4,207,780 A | 6/1980 | Saxton | |
| 4,315,556 A | 2/1982 | Timoney | |
| 4,407,382 A * | 10/1983 | Dziuba et al. | 180/10 |
| 4,489,626 A | 12/1984 | Lemon | |
| 5,088,967 A | 2/1992 | Opitz et al. | |
| 5,356,351 A | 10/1994 | Hvolka | |
| 5,435,793 A | 7/1995 | Varela et al. | |
| 6,672,985 B2 | 1/2004 | Chung et al. | |
| 6,676,228 B1 | 1/2004 | Varela et al. | |
| 6,695,738 B2 | 2/2004 | Sullivan et al. | |
| 6,886,655 B2 | 5/2005 | Varela et al. | |
| 7,204,339 B2 | 4/2007 | Varela et al. | |
| 7,314,105 B2 | 1/2008 | Varela et al. | |
| 7,350,606 B2 | 4/2008 | Brill et al. | |
| 2008/0236908 A1 | 10/2008 | Cooper et al. | |

FOREIGN PATENT DOCUMENTS

| | | |
|---|---|---|
| FR | 509275 | 11/1920 |
| GB | 2055714 | 3/1981 |
| JP | 040095 | 2/1996 |
| SU | 1207823 | 1/1986 |

OTHER PUBLICATIONS

European Search Report Dated Aug. 30, 2010.

* cited by examiner

*Primary Examiner* — Tisha Lewis
(74) *Attorney, Agent, or Firm* — Carlson, Gaskey & Olds, PC

(57) ABSTRACT

A planetary wheel end assembly includes an axle shaft having an inboard end and an outboard end and a planetary gear assembly that receives driving input from the axle shaft. The planetary gear assembly includes a sun gear that is fixed for rotation with the axle shaft, a plurality of planet gears that are in meshing engagement with the sun gear, a non-rotating ring gear that is in meshing engagement with the planet gears, and a planetary spider that supports the plurality of planet gears. The planetary spider provides driving output to rotate a wheel component. The sun gear includes a sun gear body having a plurality of sun gear teeth in meshing engagement with the planet gears and a plurality of splines that are coupled with mating splines on the axle shaft. The plurality of splines are axially inboard of the plurality of sun gear teeth.

19 Claims, 2 Drawing Sheets

PLANETARY WHEEL END ASSEMBLY

TECHNICAL FIELD

The subject invention relates to a planetary wheel end that includes an axle shaft and planetary gear assembly configuration that minimizes sun gear stresses.

BACKGROUND OF THE INVENTION

Planetary wheel end assemblies include a planetary gear assembly that receives driving input from an axle shaft. A typical planetary gear assembly includes a sun gear that is fixed for rotation with the axle shaft, a plurality of planet gears, a ring gear, and a planetary spider that supports the planet gears. In one known configuration, the ring gear is fixed to a non-rotating component, such as a housing for example, and the planetary spider provides driving output for a wheel component.

Typically, the sun gear comprises a cylindrical gear body having an outer peripheral surface with a plurality of sun gear teeth and an inner peripheral surface that includes a set of sun gear splines. A radial wall thickness is defined in a radial direction extending between a root area at roots of the gear teeth and a spline base area at locations between adjacent sun gear splines. The axle shaft has a set of mating axle shaft splines that cooperate with the sun gear splines such that the axle shaft and sun gear rotate together. As input torque into the wheel end increases, a larger diameter axle shaft is often required. Due to high hoop stresses caused by the axle shaft splines in combination with a bending moment on the gear body generated by gear teeth bending, the remaining radial wall thickness for a traditional sun gear becomes insufficient.

Solutions have been proposed to address this condition but these solutions have been proven to be expensive and require large space to package. For example, sun gear size has been increased in a radial and axial direction but this is disadvantages from a weight and cost perspective. Further, when the sun gear is enlarged in this manner, the sun gear spline can no longer be inexpensively broached. Thus, there is a need to provide a sun gear configuration that minimizes stresses such that a sun gear spline can still be broached.

SUMMARY OF THE INVENTION

A planetary wheel end assembly includes an axle shaft having an inboard end and an outboard end and a planetary gear assembly that receives driving input from the axle shaft. The planetary gear assembly includes a sun gear that is fixed for rotation with the axle shaft, a plurality of planet gears that are in meshing engagement with the sun gear, a non-rotating ring gear that is in meshing engagement with the planet gears, and a planetary spider that supports the plurality of planet gears. The planetary spider provides driving output to rotate a wheel component. The sun gear includes a sun gear body having a plurality of sun gear teeth in meshing engagement with the planet gears and a plurality of splines that are coupled with mating splines on the axle shaft. The plurality of splines are axially inboard of the plurality of sun gear teeth.

In one example, the sun gear body has a greater outermost diameter at the inboard end than at the outboard end.

In one example, the sun gear body has a greater radial wall thickness at the inboard end than at the outboard end.

In one example, the axle shaft extends through the sun gear body with the outboard end of the axle shaft being rotatably supported within the planetary spider. The planetary spider is fixed to an output shaft that includes a wheel mount interface.

A housing encloses the planetary gear assembly and an inboard portion of the output shaft. Bearings support the output shaft for rotation relative to the housing. The bearings are positioned outboard of the planetary gear assembly.

In one example, the planetary wheel end assembly includes a wet disc brake that includes rotating brake discs, non-rotating discs, and an actuator that brings the rotating and non-rotating discs together to slow or stop a vehicle. The rotating brake discs are rotationally fixed to the inboard end of the sun gear body. The wet disc brake is located inboard of the planetary gear assembly and is enclosed by the housing.

The planetary gear assembly provides a sun gear configuration that eliminates hoop stresses to provide for a sun gear that can be manufactured at a low cost. These and other features of the present invention can be best understood from the following specification and drawings, the following of which is a brief description.

DETAILED DESCRIPTION OF THE PREFERRED EMBODIMENT

Figure 1:
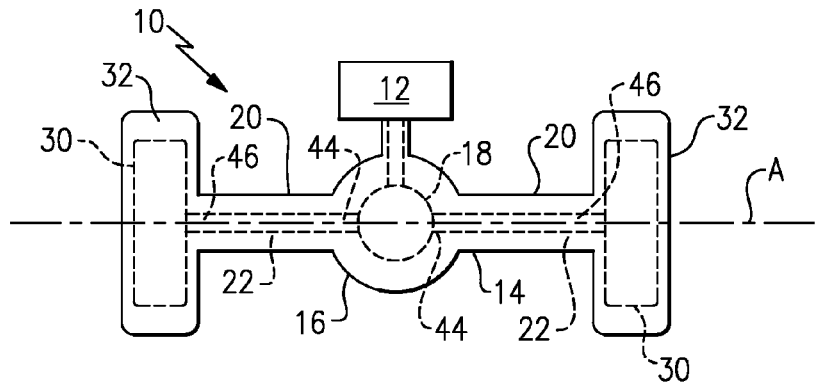
FIG. 1 is a schematic view of a drive axle with planetary wheel end assemblies.

A drive axle 10 receives driving input from a power source 12, such as an engine or electric motor, for example. The drive axle 10 includes an axle housing 14 that includes a carrier portion 16 that encloses a gear assembly 18 and leg portions 20 that enclose axle shafts 22. The gear assembly 18 receives the driving input from the power source 12 and provides driving output to the axle shafts 22. The gear assembly 18 typically includes a differential that receives input from an input gear assembly that includes a ring and pinion.

Figure 2:
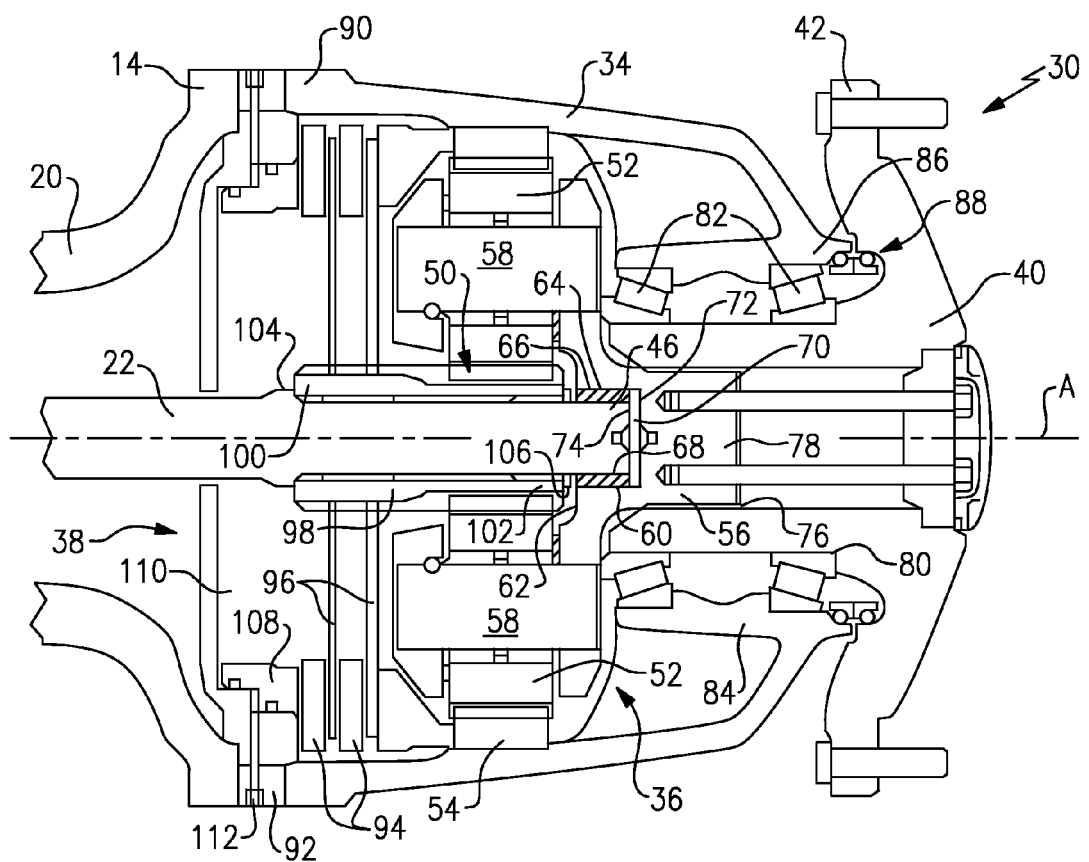
FIG. 2 is a cross-sectional view of one of the planetary wheel end assemblies of FIG. 1 incorporating the subject invention.

The axle shafts 22 drive planetary wheel end assemblies, schematically shown at 30 in FIG. 1, which in turn drive laterally spaced apart wheels 32 about an axis of rotation A. An example of the planetary wheel end assembly 30 is shown in FIG. 2. The planetary wheel end assembly 30 includes a housing 34 that is mounted to the leg portion 20 of the axle housing 14. The housing 34 encloses a planetary gear assembly 36 and a wet disc brake 38. The planetary gear assembly 36 receives driving input from the axle shaft 22 and provides driving output to an output shaft 40. The output shaft 40 includes a wheel mount flange 42 that provides a mounting interface for the wheel 32.

The axle shaft 22 includes an inboard end 44 that is coupled to the gear assembly 18 (FIG. 1) and an outboard end 46 that drives the planetary gear assembly 36. The planetary gear assembly 36 includes a sun gear 50 that is fixed for rotation with the axle shaft 22 near the outboard end 46, a plurality of planet gears 52 that are in meshing engagement with the sun gear 50, a non-rotating ring gear 54 that is in meshing engagement with the planet gears 52, and a planetary spider 56 that supports the planet gears 52. The planet gears 52 are supported on planet pins 58 that are fixed to the planetary spider 56. The ring gear 54 is fixed to the housing 34. The sun gear 50 drives the planet gears 52 against the ring gear 54 to provide driving output via the planetary spider 56.

The planetary spider 56 includes a bore 60 that is formed within an inboard end face 62 of the planetary spider 56. The bore 60 receives a rotational support element 64 that pilots the outboard end 46 of the axle shaft 22 within the planetary spider 56. The rotational support element 64 comprises a bushing or bearing that defines an outer surface 66 that abuts directly against a surface defining the bore 60 and an inner surface 68 that abuts directly against an outer surface of the axle shaft 22. By using the rotational support element 64 to pilot the axle shaft 22, sun gear runout is more precisely controlled than what would be provided by backlash and runout of the planetary gears alone.

A thrust element 70 is positioned between an end face 72 of the bore 60 and a shaft end face 74 of the axle shaft 22. The thrust element 70 can comprise a spacer or washer for example.

The output shaft 40 is driven by the planetary spider 56. The output shaft 40 includes a bore 76 that receives an outboard end 78 of the planetary spider 56. An outer surface 80 of the output shaft 40 supports a set of wheel bearings 82. The wheel bearings 82 are seated in a bearing cage portion 84 of the housing 34. The wheel bearings 82 are positioned outboard of the planetary gear assembly 36 and are positioned directly between the bearing cage portion 84 and the outer surface 80 of the output shaft. The wheel bearings 82 rotatably support the output shaft 40 for rotation relative to the housing 34.

The wheel mount flange 42 extends outwardly from an outboard end portion 86 of the housing 34. Seals 88 are provided at an interface between the output shaft 40 and the outboard end portion 86 of the housing 34.

The wet disc brake 38 is enclosed within an inboard end portion 90 of the housing 34. The wet disc brake 38 includes a brake housing 92, a plurality of stationary discs 94 that are fixed to the housing 34, and a plurality of rotating discs 96 that are fixed for rotation with the axle shaft 22. In the example shown, the rotating discs 96 are fixed to the sun gear 50, which is fixed for rotation with the axle shaft 22; however the discs 96 could also be fixed directly to the axle shaft 22. The rotating discs 96 are movable axially relative to the axle shaft 22 and the stationary discs 94 are rotationally restrained but are movable axially relative to the housing 34.

The sun gear includes a sun gear body 98 that has an inboard end 100 and an outboard end 102. The sun gear body 98 is mounted near the outboard end 46 of the axle shaft 22. The outboard end 46 of the axle shaft 22 extends entirely through the sun gear body 98 to a location outboard of the outboard end 102 of the sun gear body 98. The rotational support element 64 is mounted on this exposed portion of the axle shaft 22. Thus, the rotational support element 64 and the sun gear body 98 are axially spaced apart from each other in a direction extending along the axis of rotation A.

The axle shaft 22 includes a first a first stop 104 to engage an inboard end face of the sun gear body 98 and a second stop 106 to engage an outboard end face of the sun gear body 98 to prevent relative axial movement between the sun gear body 98 and said axle shaft 22. In one example, the first stop 104 comprises an enlarged shoulder portion formed about an outer circumference of the axle shaft 22 and the second stop 106 comprises a snap ring or other type of retaining element.

The wet disc brake 38 also includes a piston 108 that is positioned within the brake housing 92. The brake housing 92 provides a sealed cavity 110 for the wet disc brake 38. A port 112 extending through the brake housing 92 delivers fluid to actuate movement of the piston 108 as known. Actuation of the piston 108 produces a uniform compressive axial force between the slidable stationary discs 94 and the slidable rotating discs 96, which in turn brakes the axle shaft 22. This brake torque is then transmitted to the wheel mount flange 42 in an amplified manner through the planetary gear assembly 36.

In the example shown in FIG. 2, the brake housing 92 is positioned between the axle housing 14 and the housing 34 of the planetary wheel end assembly 30. A single set of fasteners (not shown) can be used to secure these three housing portions together. Optionally, the brake housing could be formed as part of the axle housing 14 and/or the housing 34.

As discussed above, piloting the axle shaft 22 to the planetary spider 56 assures that sun gear runout is more precisely controlled. Another advantage with the planetary wheel end assembly 30 is that the rotating brake discs 96 are better centered to reduce the affects of centrifugal forces and vibrations. This reduces noise and improves fatigue life of the gear components.

Figure 3:
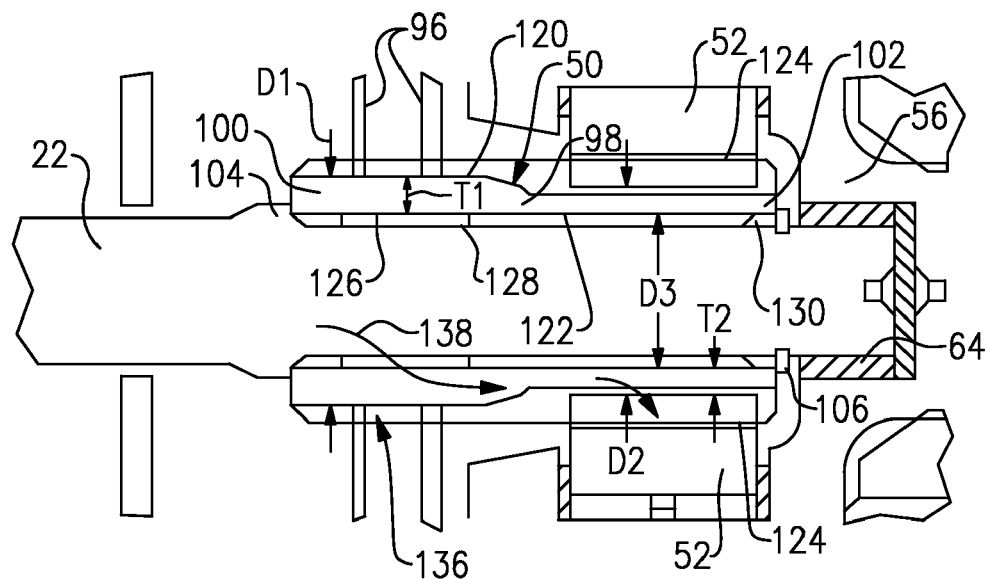
FIG. 3 is an enlarged view of a sun gear and axle shaft interface from FIG. 2.

The sun gear body 98 is shown in greater detail in FIG. 3. The sun gear body 98 has an outer peripheral surface 120 and an inner peripheral surface 122 that extend between the inboard end 100 and the outboard end 102. The outer peripheral surface 120 includes a plurality of sun gear teeth 124 that are in meshing engagement with the plurality of planet gears 52. The inner peripheral surface 122 includes a main set of splines 126 that are coupled with mating splines 128 formed on the axle shaft 22. The main set of splines 126 is axially inboard of the plurality of sun gear teeth 124. Thus, there is a non-overlapping relationship between the plurality of sun gear teeth 124 and the main set of splines 126.

The sun gear body 98 is defined by a first outermost diameter D1 at the inboard end 100 and a second outermost diameter D2 at the outboard end 102. The first outermost diameter D1 is greater than the second outermost diameter D2. The inner peripheral surface 122 is defined by an innermost diameter D3 that remains generally constant along a length of the sun gear body 98. The inner peripheral surface 122 defines a bore through which the outboard end 46 of the axle shaft 22 extends.

As shown, the sun gear body 98 is defined by a first radial wall thickness T1 at the inboard end 100. The sun gear body 98 is defined by a second radial wall thickness T2 at the outboard end 102. The first radial wall thickness T1 and the second radial wall thickness T2 each extend radially between the inner 122 and the outer 120 peripheral surfaces. The first radial wall thickness T1 is greater than the second radial wall thickness T2. The main set of splines 126 is formed along a portion of the inner peripheral surface 122 that is defined by the first radial wall thickness T1 and the plurality of sun gear teeth 124 is formed along a portion of the outer peripheral surface 120 that is defined by the second radial wall thickness T2.

The rotating discs 96 of the wet disc brake are fixed for rotation with the inboard end 100 of the sun gear body 98. The outer peripheral surface 120 of the sun gear body 98 includes a spline connection interface 136 that receives the rotating discs 96. The spline connection interface 136 fixes the discs 96 for rotation with the sun gear 50 and axle shaft 22, while allowing the discs 96 to slide in an axial direction along the sun gear 50 during braking requests.

In the example shown in FIG. 3, the sun gear body 98 includes a pilot portion 130 formed within the inner peripheral surface 122 at the outboard end 102. The pilot portion 130 serves to align the sun gear 50 with the axle shaft 22 if the axle shaft 22 is not piloted into the planetary carrier 56.

The configuration of FIG. 3 provides for a primary torque path 138 that flows through the sun gear body 98 from the inboard end 100 at a connection interface between the axle shaft 22 and the sun gear 50, in a generally axial direction along the axis of rotation A, to the outboard end 102 at a meshing engagement interface between the sun gear 50 and the plurality of planet gears 52. This reduces resulting stresses on the sun gear 50 by eliminating hoop stresses that resulted from a spline pressure angle at a traditional sun gear and axle shaft connection area. The configuration set forth in FIG. 3 allows for a larger bore diameter, i.e. innermost diameter D3, for the sun gear 50 and consequently a larger axle shaft spline diameter while still allowing for broached splines.

Figure 4:
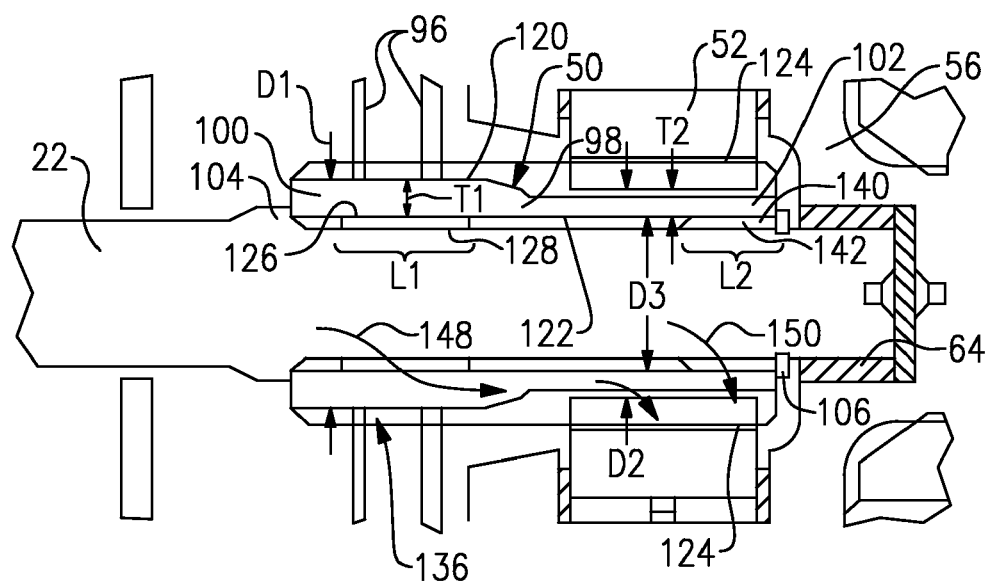
FIG. 4 is an enlarged view of another example of a sun gear and axle shaft interface.

FIG. 4 shows an example where the sun gear body 98 includes a secondary set of splines 140 formed within the inner peripheral surface 122 at the outboard end 102. This secondary set of splines 140 mates with a secondary set of axle shaft splines 142 that are spaced outboard of the mating splines 128 that couple the inboard end 100 of the sun gear body 98 to the axle shaft 22. The main set of splines 126 is defined by a first length L1 extending along the axis of rotation A and the secondary set of splines 140 is defined by a second length L2 extending along the axis of rotation A. The first length L1 is greater than the second length L2. In the example of FIG. 4, the main set of splines 126 only extend along a portion of the sun gear body 98 defined by the first outermost diameter D1 and the secondary set of splines 140 only extend along a portion of the sun gear body 98 defined by the second outermost diameter D2.

The configuration of FIG. 4 provides for an optimized torque path where a primary torque path 148 flows through the sun gear body 98 from the inboard end 100 at the spline connection interface between the axle shaft 22 and the sun gear 50, in a generally axial direction along the axis of rotation A, to the outboard end 102 at a meshing engagement interface between the sun gear 50 and the plurality of planet gears 52. A smaller portion of the torque is transferred to the outboard end 102 of the sun gear body 98 via the secondary set of splines as indicated by arrow 150. This also reduces resulting stresses in the sun gear 50 as described above. The length L2 of the secondary set of splines 140 can be "tuned" or varied in a way that the resulting stress on the sun gear body 98 at this location does not exceed the stress on the inboard end 100 of the sun gear body 98.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A planetary wheel end assembly comprising:
   an axle shaft defining an axis of rotation, said axle shaft having an inboard end and an outboard end;
   a planetary gear assembly including a sun gear driven by said axle shaft, a plurality of planet gears in meshing engagement with said sun gear, a non-rotating ring gear in meshing engagement with said plurality of planet gears, and a planetary spider supporting said planet gears, said planetary spider providing a driving output to rotate a wheel component, and wherein said outboard end of said axle shaft is rotatably supported within said planetary spider;
   wherein said sun gear includes a sun gear body having an outer peripheral surface and an inner peripheral surface extending between an inboard body end and an outboard body end, said outer peripheral surface including a plurality of sun gear teeth in meshing engagement with said plurality of planet gears, and said inner peripheral surface including a plurality of splines interfacing with mating splines on said axle shaft, and wherein said plurality of splines are axially inboard of said plurality of sun gear teeth;
   a housing enclosing said planetary gear assembly;
   an output shaft fixed to said planetary spider; and
   a wheel bearing assembly mounted between said output shaft and said housing.

2. The planetary wheel end assembly according to claim 1 including a non-overlapping relationship between said plurality of sun gear teeth and said plurality of splines in a radial direction.

3. The planetary wheel end assembly according to claim 1 wherein said sun gear body is defined by a first outermost diameter at said inboard body end and a second outermost diameter at said outboard body end, said first outermost diameter being greater than said second outermost diameter.

4. The planetary wheel end assembly according to claim 1 wherein said sun gear body is defined by a first radial wall thickness at said inboard body end extending radially between said inner and said outer peripheral surfaces, and wherein said sun gear body is defined by a second radial wall thickness at said outboard body end extending radially between said inner and said outer peripheral surfaces, said first radial wall thickness being greater than said second radial wall thickness.

5. The planetary wheel end assembly according to claim 4 wherein said plurality of splines is formed along a portion of said inner peripheral surface that is defined by said first radial wall thickness and said plurality of sun gear teeth is formed along a portion of said outer peripheral surface that is defined by said second radial wall thickness.

6. The planetary wheel end assembly according to claim 1 wherein said sun gear body includes a pilot portion formed within said inner peripheral surface at said outboard body end, said pilot portion aligning said sun gear with said axle shaft.

7. A planetary wheel end assembly comprising:
   an axle shaft defining an axis of rotation, said axle shaft having an inboard end and an outboard end;
   a planetary gear assembly including a sun gear driven by said axle shaft, a plurality of planet gears in meshing engagement with said sun gear, a non-rotating ring gear in meshing engagement with said plurality of planet gears, and a planetary spider supporting said planet gears, said planetary spider providing a driving output to rotate a wheel component;
   wherein said sun gear includes a sun gear body having an outer peripheral surface and an inner peripheral surface extending between an inboard body end and an outboard body end, said outer peripheral surface including a plurality of sun gear teeth in meshing engagement with said plurality of planet gears, and said inner peripheral surface including a plurality of splines interfacing with mating splines on said axle shaft, and wherein said plurality of splines are axially inboard of said plurality of sun gear teeth; and
   wherein said plurality of splines of said sun gear body comprise a main set of splines and wherein said mating splines on said axle shaft comprise a main set of axle shaft splines, and including a secondary set of splines formed within said inner peripheral surface at said outboard body end that mate with a secondary set of axle shaft splines spaced outboard of said main set of axle shaft splines.

8. The planetary wheel end assembly according to claim 7 wherein said main set of splines is defined by a first length extending along said axis of rotation and said secondary set of splines is defined by a second length extending along said axis of rotation, said first length being greater than said second length.

9. The planetary wheel end assembly according to claim 7 wherein said sun gear body is defined by a first outermost diameter at said inboard body end and a second outermost diameter at said outboard body end, said first outermost diameter being greater than said second outermost diameter, and wherein said main set of splines only extend along a portion of said sun gear body defined by said first outermost diameter and said secondary set of splines only extend along a portion of said sun gear body defined by said second outermost diameter.

10. The planetary wheel end assembly according to claim 1 including a brake with at least one rotating brake element, at least one non-rotating brake element, and an actuator that exerts an axial force to move said at least one rotating brake element and said at least one non-rotating brake element into engagement with each other, and wherein said at least one rotating brake element is fixed for rotation with said sun gear body.

11. The planetary wheel end assembly according to claim 10 wherein said brake comprises a wet disc brake with said at least one rotating brake element comprising at least one rotating disc fixed to said inboard body end of said sun gear body, said at least one non-rotating brake element comprising at least one stationary disc fixed to a housing, and said actuator comprising a piston.

12. The planetary wheel end assembly according to claim 11 wherein said housing encloses said wet disc brake and said planetary gear assembly.

13. The planetary wheel end assembly according to claim 12 wherein said wet disc brake is positioned axially inboard of said planetary gear assembly.

14. The planetary wheel end assembly according to claim 1 wherein said wheel bearing assembly is positioned substantially outboard of said planetary gear assembly.

15. The planetary wheel end assembly according to claim 1 wherein torque flow within said sun gear body extends from said inboard body end at a connection interface between said axle shaft and said sun gear in a generally axial direction along said axis of rotation to said outboard body end at a meshing engagement interface between said sun gear and said plurality of planet gears.

16. The planetary wheel end assembly according to claim 1 wherein the planetary gear assembly comprises a single reduction gear assembly.

17. The planetary wheel end assembly according to claim 1 wherein said output shaft is configured to drive a wheel about said axis of rotation and wherein said sun gear body is concentric with said axis of rotation.

18. The planetary wheel end assembly according to claim 14 including a brake with at least one rotating brake element, at least one non-rotating brake element, and an actuator that exerts an axial force to move said at least one rotating brake element and said at least one non-rotating brake element into engagement with each other, and wherein said wheel bearing assembly is located outboard of said brake.

19. The planetary wheel end assembly according to claim 18 wherein the planetary gear assembly comprises a single reduction gear assembly and wherein said output shaft is configured to drive a wheel about said axis of rotation and wherein said sun gear body is concentric with said axis of rotation.

* * * * *